United States Patent [19]

Granados et al.

[11] Patent Number: 5,383,704
[45] Date of Patent: Jan. 24, 1995

[54] INTERMEDIATE ARMREST FOR A ROW OF SEATS

[75] Inventors: Reginald F. Granados, Reading; Michael J. Robinson, Farnborough, both of England

[73] Assignee: L.A. Rumbold Limited, England

[21] Appl. No.: 135,677

[22] Filed: Oct. 13, 1993

[30] Foreign Application Priority Data

Apr. 29, 1993 [GB] United Kingdom ............... 9308896

[51] Int. Cl.⁶ .......................................... A47C 17/04
[52] U.S. Cl. ................... 297/115; 297/411.36
[58] Field of Search .......... 297/115, 411.2, 411.3, 297/411.35, 411.36, 232, 248

[56] References Cited

U.S. PATENT DOCUMENTS

| | | | |
|---|---|---|---|
| 2,568,988 | 9/1951 | Childs | 297/344.18 X |
| 3,116,093 | 12/1963 | Bosack | 297/115 X |
| 3,124,328 | 3/1964 | Kortsch | 297/411.36 X |
| 3,191,995 | 6/1965 | Shelton | 297/115 X |
| 4,145,020 | 3/1979 | Webster | 297/411.3 X |
| 4,176,878 | 12/1979 | Koutsky | 297/115 |
| 4,533,175 | 8/1985 | Brennan | 297/115 X |
| 4,657,305 | 4/1987 | Meiller | 297/115 X |
| 4,984,847 | 1/1991 | Bedu et al. | |
| 5,050,933 | 9/1991 | Tornero et al. | 297/155 X |
| 5,143,422 | 9/1992 | Althofer et al. | 297/115 X |
| 5,265,938 | 11/1993 | Melhursh et al. | 297/411.36 |
| 5,318,347 | 6/1994 | Tseng | 297/411.36 |

FOREIGN PATENT DOCUMENTS

| | | |
|---|---|---|
| 0346251 | 12/1989 | European Pat. Off. . |
| 2424829 | 11/1979 | France . |
| 9103954 | 7/1991 | Germany . |
| 889650 | 2/1962 | United Kingdom . |

*Primary Examiner*—Kenneth J. Dorner
*Assistant Examiner*—Milton Nelson, Jr.
*Attorney, Agent, or Firm*—Davis, Bujold & Streck

[57] ABSTRACT

An armrest, for use between adjacent seats in a row of seats, is movable between a deployed position, and a stowed position. The armrest is secured to a carriage which is slidably mounted on a track located between the backrests of the adjacent seats. The carriage movable on the track between an upper position in which the armrest is at a desired level for use and a lower position in which the armrest is level with the seat cushions of the seat. A releasable latching bolt secures the carriage in its upper position.

7 Claims, 3 Drawing Sheets

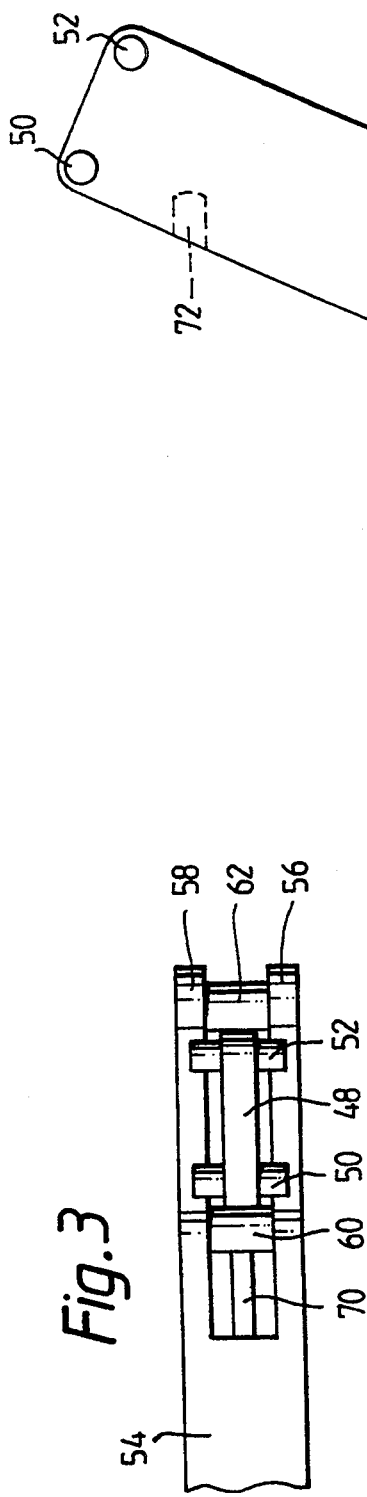
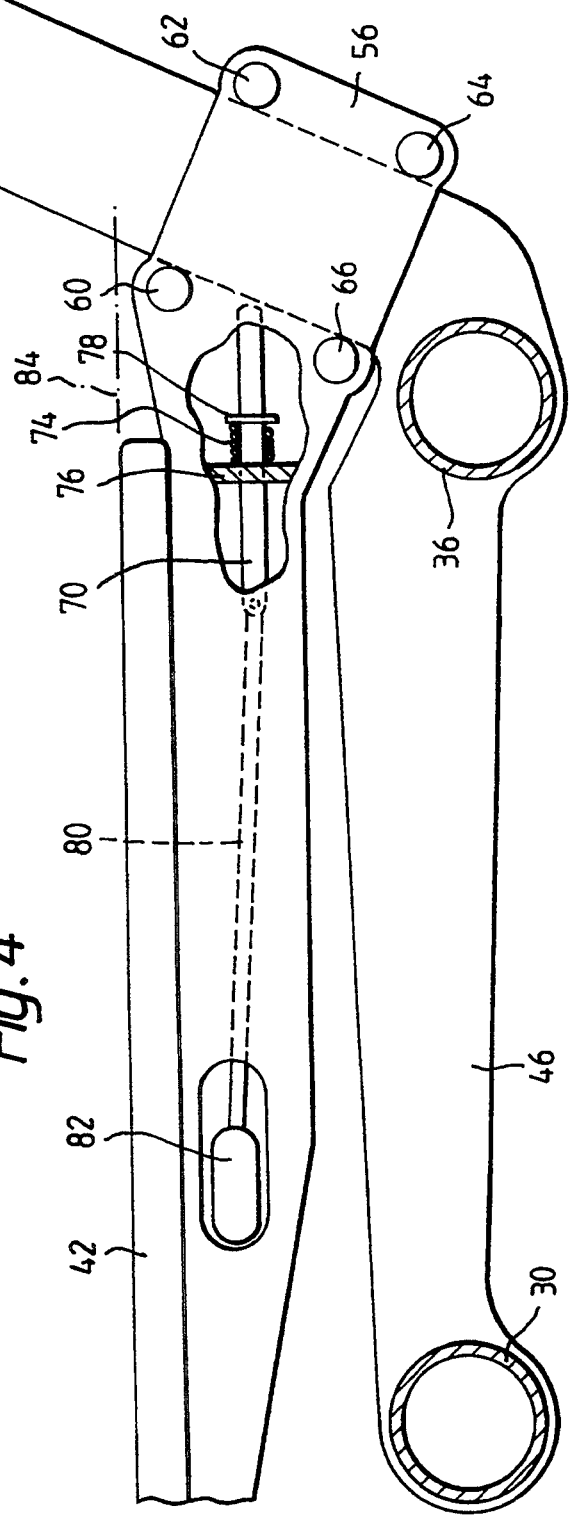
Fig. 3
Fig. 4

INTERMEDIATE ARMREST FOR A ROW OF SEATS

FIELD

This invention relates to an armrest for use between adjacent seats in a row of seats, the armrest being movable between a deployed position and a stowed position in which the upper surface of the armrest is level with the seat cushions of the adjacent seats. An armrest of this type is particularly applicable to passenger seats for use in an aircraft.

RELATED ART

A known armrest of this type is supported on two pivotable links forming a parallelogram-type mechanism allowing the armrest to be moved between its deployed position and its stowed position. The present invention is concerned with the provision of an armrest of the type described above, using a simpler mechanism.

SUMMARY OF THE INVENTION

According to the invention, an armrest assembly, for a seat having a seat cushion, comprises a track located between backrests of adjacent seats in a row of seats, a carriage slidably mounted on the track and an armrest secured to the carriage, and releasable locking means for securing the carriage in an upper position on the track, the carriage being movable on the track between said upper position in which the armrest is at a desired level for use and a lower position in which the armrest is level with the seat cushions of the seats.

The track may be of rectangular cross-section and the carriage may have a first guide member arranged to engage with one edge of the track and a second guide member arranged to engage with an opposite edge of the track. Preferably, there are two such guide members engaging with each of said edges of the track.

Preferably, the locking means is releasable by manually actuable release means mounted on the armrest. The locking means may comprise a bolt mounted on the armrest and spring biassed towards the track so as to be engageable with a detent formation thereon.

BRIEF DESCRIPTION OF THE DRAWINGS

FIG. 3 is a scrap plan view of the upper end of and support mechanism for the armrest shown in FIG. 2; and FIG. 4 is a side view, similar to FIG. 2, but showing the armrest in its stowed position.

DETAILED DESCRIPTION OF THE PREFERRED EMBODIMENT

Figure 1:
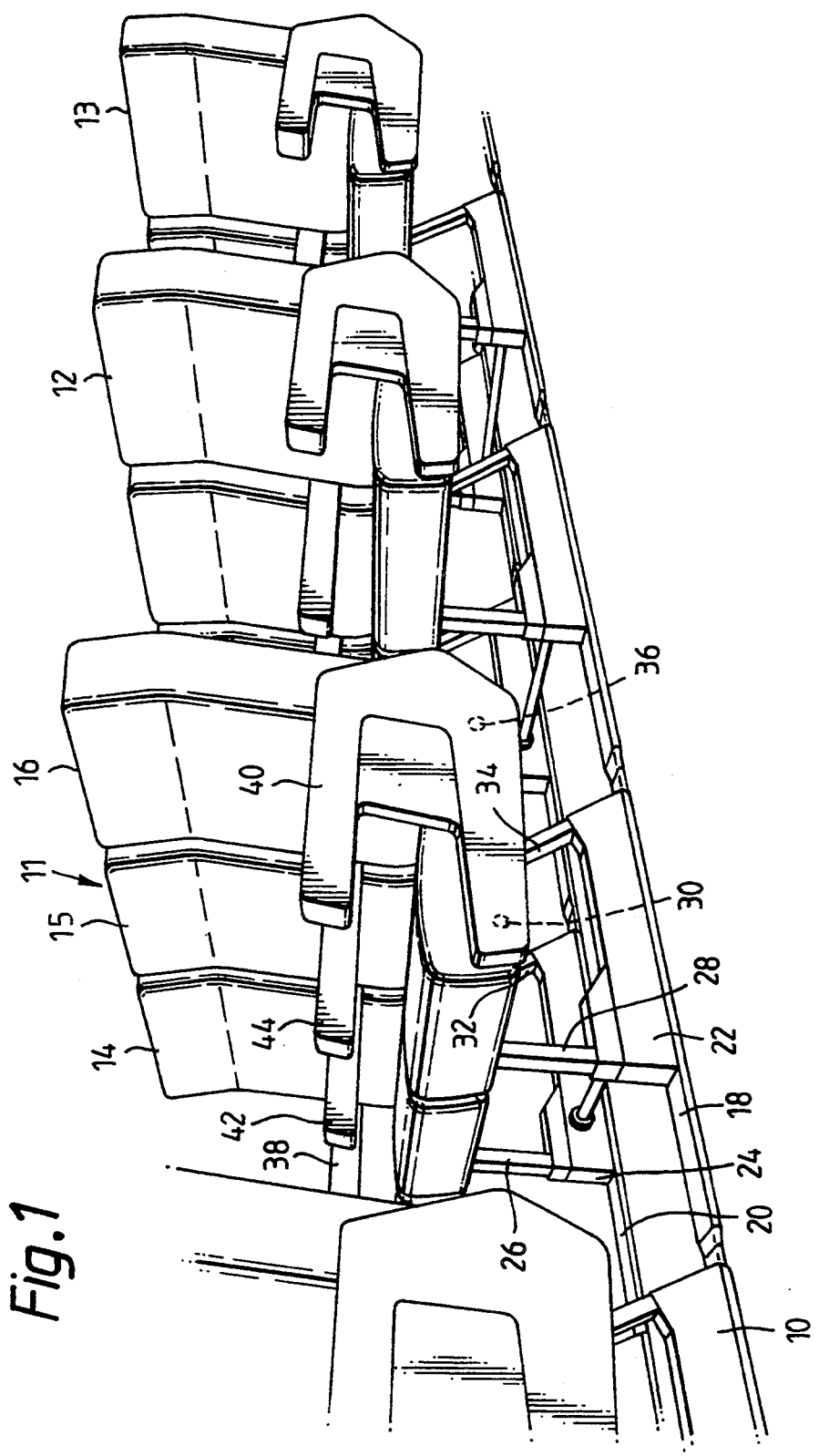
FIG. 1 is a perspective view showing a number of rows of seating units, each consisting of three seats.

FIG. 1 shows four adjacent seating units 10, 11, 12 and 13. The seating unit 11 will be described in more detail, by way of example, but it should be understood that all four seating units are substantially identical.

The seating unit 11, which provides three seats 14, 15 and 16, is mounted on two longitudinally extending tracks 18 and 20 in the aircraft floor. Each track is engaged by a respective base member 22, 24. Front legs 26 and 28 extend upwardly from the front end of the base members 22 and 24 and support a front transverse member 30 which is covered by the upholstery of the seating unit 11. Similarly, rear legs 32 and 34 extends upwardly from the rear end of the base members 22 and 24 and support a rear transverse member 36. End armrest 38 and 40 are secured to the ends of the transverse members 30 and 36.

Figure 2:
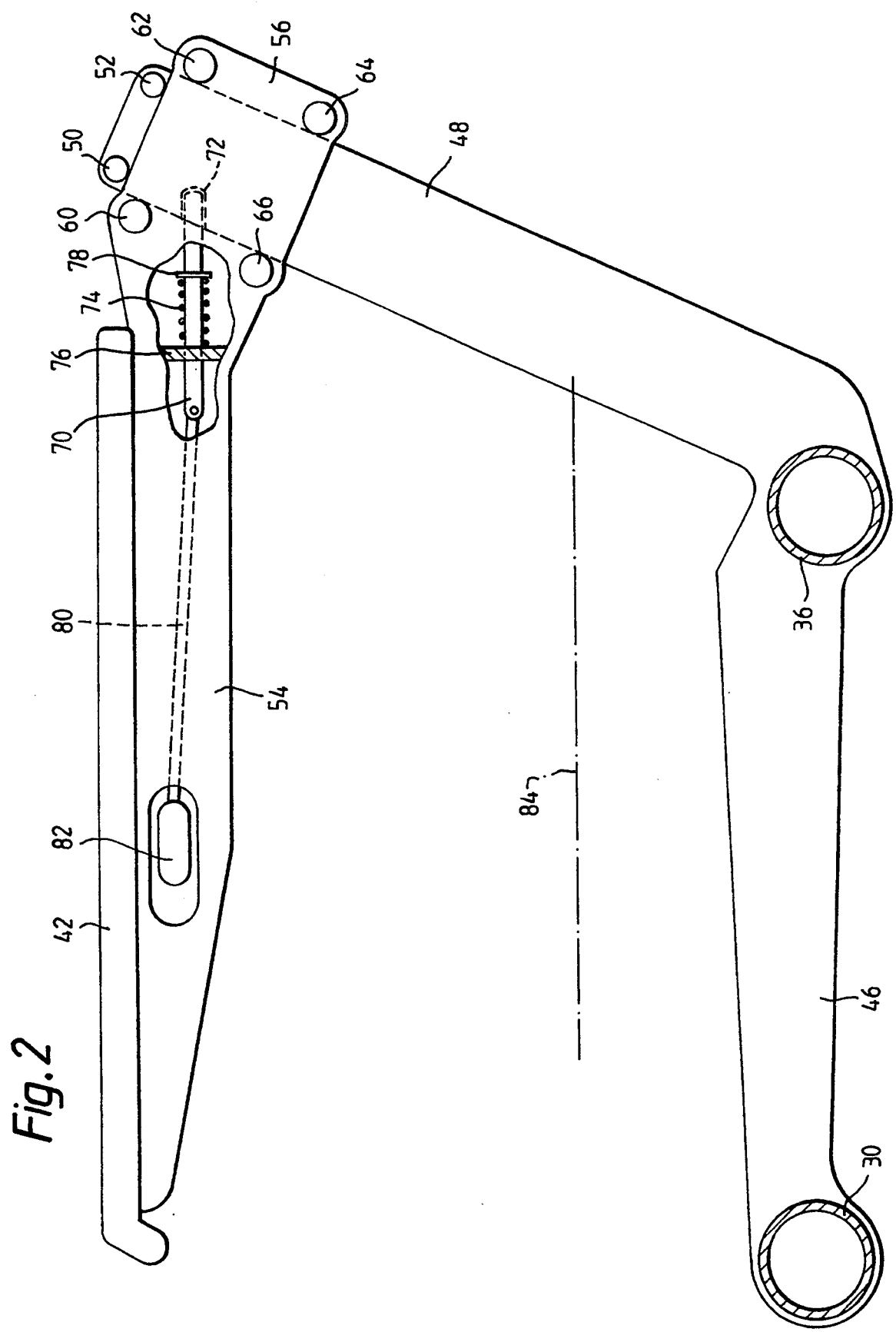
FIG. 2 is a partially broken away side view showing an armrest in accordance with the invention fitted to one of the seat units shown in FIG. 1, with the armrest in its deployed position.

An intermediate armrest 42, in accordance with the invention, is located between adjacent seats 14 and 15 of the seating unit 11. Referring to FIGS. 2 and 3, the armrest 42 is mounted on an armrest support member 46 which is secured to the transverse members 30 and 36 and has an upwardly projecting limb 48 with two stop pegs 50 and 52 inserted transversely through its upper end. The armrest 42 itself is secured to a support bracket 54 which extends under substantially the whole of the armrest 42 and has a carriage formed by two bifurcations 56 and 58 which embrace the limb 48 of the support member 46. Four guide rollers 60, 62, 64 and 66 are journalled between the bifurcations 56 and 58 so as to engage with opposite edges of the limb 48. The support bracket 54 is, therefore, free to slide along the limb 48, which serves as a track but its prevented from being removed from its upper end by the stop pegs 50 and 52.

In order to secure the armrest support bracket 54 in the deployed position of the armrest, as illustrated in FIG. 2, a latch bolt 70 is slidably mounted in the bracket 54 so as to project between the bifurcations 56 and 58 into engagement with a hole 72 in the limb 48. A compression spring 74 engages between an abutment flange 76 on the support bracket 54 and a flange 78 on the bolt 70 so as to bias the bolt 70 into its engaged position. The free end of the bolt 70 is connected by a rod 80 to a manually operable slide button 82 which is accessible on the side of the bracket 54 below the armrest 42.

The level of the top of the seat cushions of the adjacent seats 14 and 15 is illustrated in FIGS. 2 and 4 by the chain-dotted line 84. When it is desired to lower the armrest 42 to bring its top level with the line 84, the slide button 82 is first displaced to the left as viewed in the drawing to withdraw the bolt 70 from the hole 72 and the bifurcations 56 and 58 then slid down to the bottom of the limb 48 into the position illustrated in FIG. 4. The top surface of the armrest 42 is then level with the top of the surrounding seat cushions. It is merely necessary to lift the armrest upwardly to restore it to its deployed position, the latch bolt 70 snapping into engagement with the hole 72 as soon as it reaches alignment therewith.

Another intermediate armrest 44, similar to the armrest 42, is located between adjacent seats 15 and 16 of the seating unit 11.

We claim:

1. An armrest assembly comprising a track of rectangular cross-section located between backrests of adjacent seats in a row of seats, a carriage slidably mounted on the track and having a first guide member arranged to engage with one edge of the track and a second guide member arranged to engage with an opposite edge of the track, and an armrest secured to the carriage, and releasable locking means for securing the carriage in an upper position on the track, the carriage being movable on the track between said upper position in which the armrest is at a desired level for use and a lower position in which the armrest is level with seat cushions of the seats.

2. An armrest assembly according to claim 1, wherein the carriage has a third guide member arranged to engage with said one edge of the track and a fourth guide member arranged to engage with said opposite edge of the track.

3. An armrest assembly according to claim 2, wherein the locking means is releasable by manually actuable release means mounted on the armrest.

4. An armrest assembly according to claim 3, wherein the locking means comprises a bolt mounted on the armrest and spring biassed towards the track so as to be engageable with a detent formation thereon.

5. An armrest assembly according to claim 1, wherein the locking means is releasable by manually actuable release means mounted on the armrest.

6. An armrest assembly according to claim 5, wherein the locking means comprises a bolt mounted on the armrest and spring biassed towards the track so as to be engageable with a detent formation thereon.

7. An armrest assembly comprising a track located between backrests of adjacent seats in a row of seats, a carriage slidably mounted on the track and an armrest secured to the carriage, a bolt mounted on the armrest that is spring biassed towards the track so as to be engageable with a detent formation thereon, for securing the carriage in an upper position on the track, and manually actuatable release means mounted on the armrest for disengaging said bolt from said detent formation, the carriage being movable on the track between said upper position in which the armrest is at a desired level for use and a lower position in which the armrest is level with seat cushions of the seats.

* * * * *